US012175954B1

(12) United States Patent
Thompson

(10) Patent No.: US 12,175,954 B1
(45) Date of Patent: Dec. 24, 2024

(54) MULTI-GUITAR STAND

(71) Applicant: Kalen Thompson, Hendersonville, NC (US)

(72) Inventor: Kalen Thompson, Hendersonville, NC (US)

( * ) Notice: Subject to any disclaimer, the term of this patent is extended or adjusted under 35 U.S.C. 154(b) by 342 days.

(21) Appl. No.: 17/863,045

(22) Filed: Jul. 12, 2022

(51) Int. Cl.
*G10G 5/00* (2006.01)
*G10H 1/00* (2006.01)

(52) U.S. Cl.
CPC ............. *G10G 5/00* (2013.01); *G10H 1/0008* (2013.01)

(58) Field of Classification Search
CPC ........ G10G 5/00; G10H 1/0008; F16M 11/16; F16M 11/38
See application file for complete search history.

(56) References Cited

U.S. PATENT DOCUMENTS

| | | | | |
|---|---|---|---|---|
| 8,055,008 | B1 | 11/2011 | Davis | |
| 8,708,167 | B2 | 4/2014 | Mone | |
| 9,564,111 | B2 | 2/2017 | Hankins | |
| 10,446,124 | B2 | 10/2019 | Jacobson | |
| 10,902,828 | B1 | 1/2021 | Baumbaugh | |
| 2018/0335177 | A1* | 11/2018 | Black | F16M 13/022 |

OTHER PUBLICATIONS https://www.pinterest.nz/pin/478859372874702866/.

* cited by examiner

*Primary Examiner* — Kimberly R Lockett
(74) *Attorney, Agent, or Firm* — Patterson Intellectual Property Law, P.C.; Mark A. Kilgore

(57) ABSTRACT

An article of manufacture for providing an improved multi-guitar stand according to the present invention in which the multi-guitar stand includes a body, a guitar neck support coupled to the top surface of the body, a set of feet coupled to the bottom surface of the body to raise the body above a floor, a first and second guitar base rests coupled to each of the pair of side surface of the body, a first and second pair of guitar base supports coupled to each of the pair of side surface of the body about the bottom surface and below the first and second guitar base rests, each of the guitar base supports extend outward, a storage cavity within the body, a first opening to the storage cavity within the front surface of the body, a second opening to the storage cavity within the front surface of the body, and a set of electronic controls coupled to the front surface of the body above the smaller detachable cover over the first opening. The body has a top surface, a bottom surface, a pair of side surfaces, a front surface and a back surface. The guitar neck support comprises a pair of U-shaped supports extending outward from the guitar neck support towards one of the two side surfaces of the body. The first opening being covered by a smaller detachable cover. The first opening being covered by a larger detachable cover. The set of electronic controls being electrically coupled to electronic circuitry within the storage cavity.

7 Claims, 4 Drawing Sheets

MULTI-GUITAR STAND

TECHNICAL FIELD

This application relates in general to an article of manufacture for providing a musical instrument support device, and more specifically, to an article of manufacture for providing an improved multi-guitar stand.

BACKGROUND

Typical guitar stands in the music industry are essentially racks that can hold or hang guitars in place. Separately, there are amp cabinets that surround a guitar amplifier. Both items take up space in a practice area or on stage. A need exists for a space-saving guitar stand that doubles as an amp cabinet with storage.

Therefore, a need exists for an article of manufacture for providing an improved multi-guitar stand. The present invention attempts to address the limitations and deficiencies in prior solutions according to the principles and example embodiments disclosed herein.

SUMMARY

In accordance with the present invention, the above and other problems are solved by providing an article of manufacture for an improved multi-guitar stand according to the principles and example embodiments disclosed herein.

In one embodiment, the present invention is an article of manufacture for providing an improved multi-guitar stand. The multi-guitar stand includes a body, a guitar neck support coupled to the top surface of the body, a set of feet coupled to the bottom surface of the body to raise the body above a floor, a first and second guitar base rests coupled to each of the pair of side surface of the body, a first and second pair of guitar base supports coupled to each of the pair of side surface of the body about the bottom surface and below the first and second guitar base rests, each of the guitar base supports extend outward, a storage cavity within the body, a first opening to the storage cavity within the front surface of the body, a second opening to the storage cavity within the front surface of the body, and a set of electronic controls coupled to the front surface of the body above the smaller detachable cover over the first opening. The body has a top surface, a bottom surface, a pair of side surfaces, a front surface and a back surface. The guitar neck support comprises a pair of U-shaped supports extending outward from the guitar neck support towards one of the two side surfaces of the body. The first opening being covered by a smaller detachable cover. The first opening being covered by a larger detachable cover. The set of electronic controls being electrically coupled to electronic circuitry within the storage cavity.

In another aspect of the present invention, the set of electronic controls comprises a pair of volume knobs, four control knobs, and a pair of speaker control knobs.

In another aspect of the present invention, the set of electronic controls adjust settings to an internal amplifier and an internal vocal amp.

In another aspect of the present invention, the volume knobs adjust the volume of the internal amplifier and the internal vocal amp.

In another aspect of the present invention, the four control knobs adjust the treble, middle, bass, and refurb settings to the amplifier.

In another aspect of the present invention, the body being wider at a base to create the storage cavity within the body.

In another aspect of the present invention, the storage cavity comprises Hooks, shelves, and organizing devices.

In another aspect of the present invention,

The foregoing has outlined rather broadly the features and technical advantages of the present invention in order that the detailed description of the invention that follows may be better understood. Additional features and advantages of the invention will be described hereinafter that form the subject of the claims of the invention.

It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Referring now to the drawings in which like reference numbers represent corresponding parts throughout.

DETAILED DESCRIPTION

Figure 1:
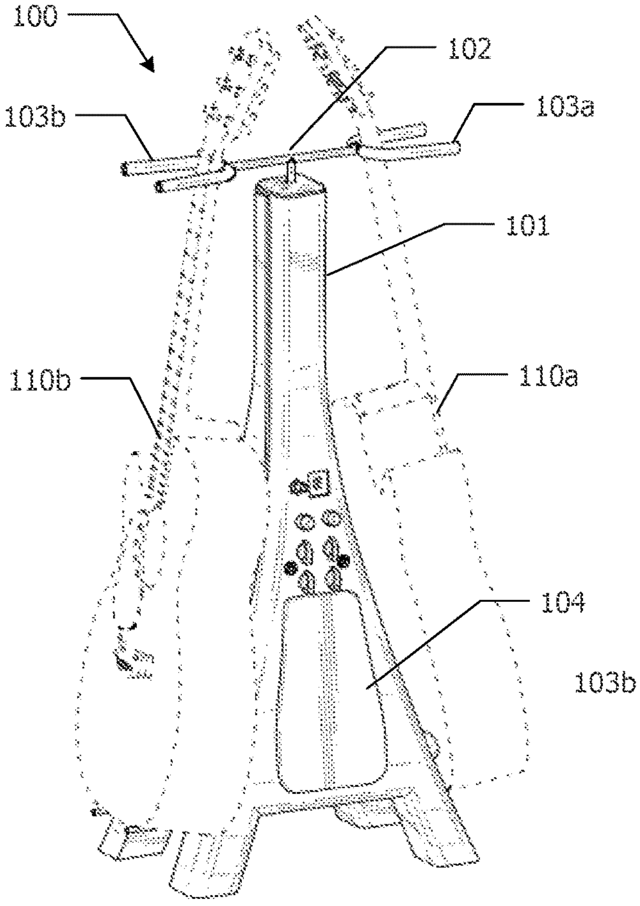
FIG. 1 illustrates a perspective view of an example embodiment of an article of manufacture providing an improved multi-guitar stand with guitars according to the present invention.

This application relates in general to an article of manufacture for providing a musical instrument support device, and more specifically, to an article of manufacture providing an improved multi-guitar stand according to the present invention.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context clearly dictates otherwise. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps or components, but do not preclude the presence or addition of one or more other features, steps or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

The terms "individual" and "user" refer to an entity, e.g., a human, using an article of manufacture providing an improved multi-guitar stand according to the present invention. The term user herein refers to one or more users.

The term "invention" or "present invention" refers to the invention being applied for via the patent application with the title "Multi-Guitar Stand." Invention may be used interchangeably with stand.

In general, the present disclosure relates to an article of manufacture for providing an improved multi-guitar stand according to the present invention. To better understand the present invention, FIG. 1 illustrates a perspective view of an example embodiment of an article of manufacture providing an improved multi-guitar stand with guitars according to the present invention. The guitar stand 100 disclosed herein is useful to support a pair of guitars 110*a-b* when they are not in use by a musician. Each guitar 110*a-b* rests on support items that are oriented to hold the guitars 110*a-b* along each of the two sides of the guitar stand 100. The guitars 110*a-b* are raised above the floor while being securely held in place until a musician removes the guitar for use.

Figure 2:
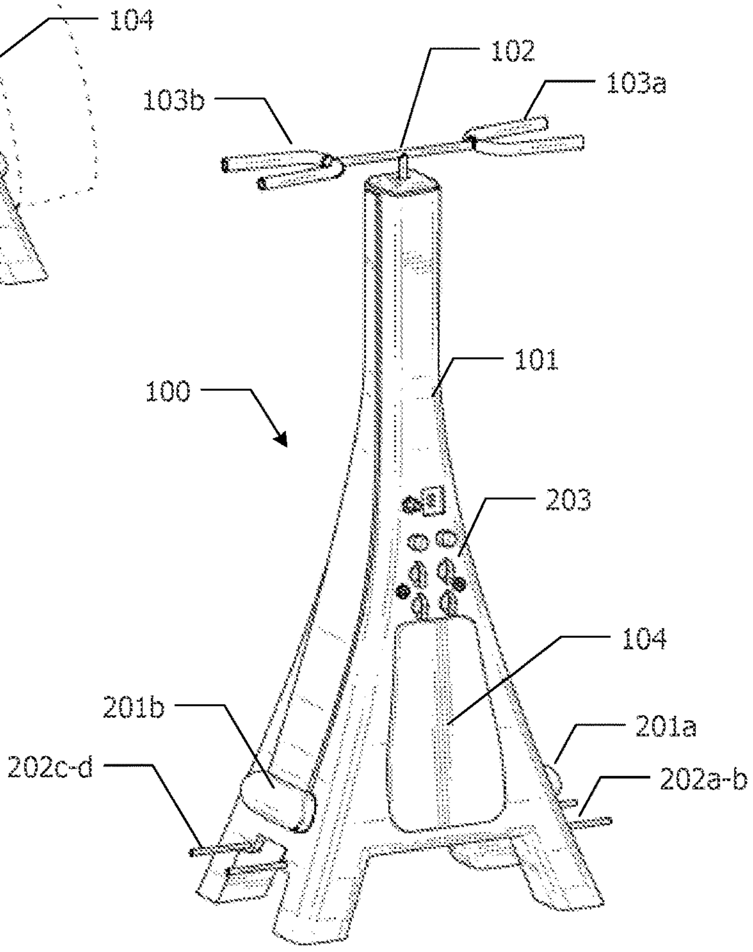
FIG. 2 illustrates a perspective view of an example embodiment of an article of manufacture providing an improved multi-guitar stand according to the present invention.

FIG. 2 illustrates a perspective view of an example embodiment of an article of manufacture providing an improved multi-guitar stand according to the present invention. The guitar stand 100 is constructed with a body 101 with a guitar neck support 102 coupled to a top surface of the body 101, two sets of guitar base rests 201*a-b*, and two sets of guitar base supports 202*a-d* on each side of the body. A guitar 110*a* may be placed with its body on top of a pair of the guitar base supports 202*a-b* with the back of the guitar body resting against the guitar base rests 201*a*. The neck of the guitar 110*a* is inserted within a U-shaped support 103*a* extending outward from the guitar neck support 102. Each of the U-shaped supports 103*a-b* extends outward a distance sufficient to hold the guitar neck within the U-shaped support 103*a-b*.

The body 101 of the guitar stand 100 is wider at the base creating a storage cavity within. A front cover 104 may be placed and removed from an opening to the storage cavity permitting a musician to access this storage volume. Hooks, shelves, and similar organizing devices may be used within the storage cavity.

A set of controls 203, that are disclosed in detail in FIG. 3 below, are placed along a front surface of the body 101 above the front cover 104 to the storage cavity. The body 101 may have a set of feet 301*a-d* extending from a bottom surface of the body 101 to raise the bottom of the guitar 110*a* above the floor as the guitar base supports 202*a-d* are attached to the side surfaces of the body 101 above the bottom surface of the guitar stand 100.

Figure 3:
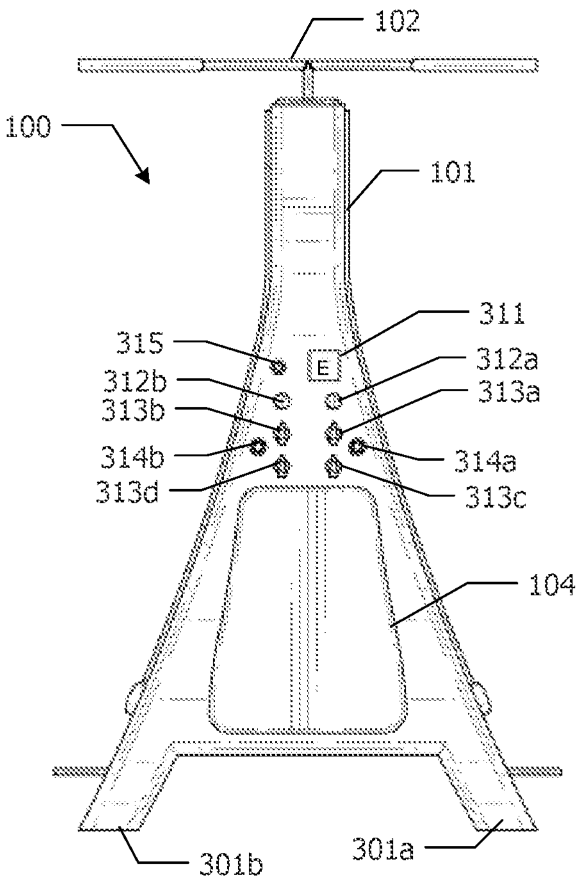
FIG. 3 illustrates a front view of an example embodiment of an article of manufacture providing an improved multi-guitar stand according to the present invention
Figure 4:
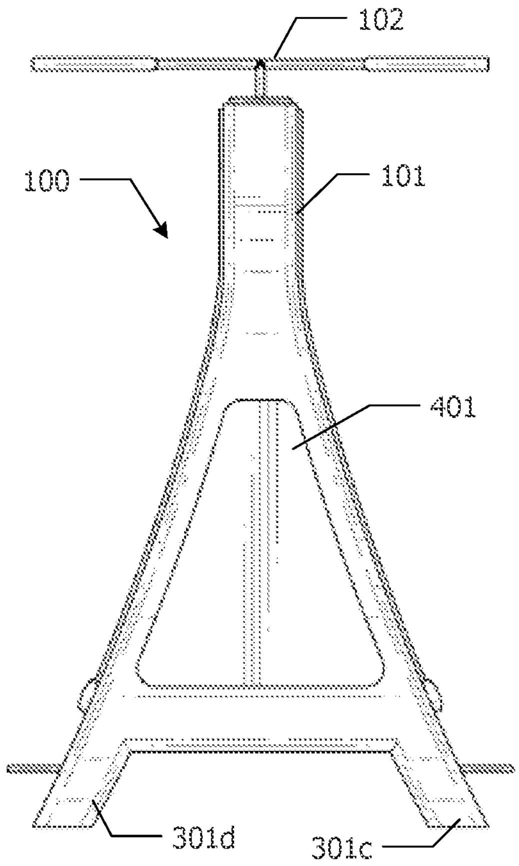
FIG. 4 illustrates a rear view of an example embodiment of an article of manufacture providing an improved multi-guitar stand according to the present invention.

FIG. 3 illustrates a front view of an example embodiment of an article of manufacture providing an improved multi-guitar stand according to the present invention. Similarly, FIG. 4 illustrates a rear view of an example embodiment of an article of manufacture providing an improved multi-guitar stand according to the present invention. A front view 300 shows the front cover 104 and the set of controls 203 along its front surface. The set of feet 301*a-d* are shown extending downward from the body 101 on each of its sides.

The front cover 104 is shown in place covering the storage cavity within the body 100. The guitar neck support 102 and the corresponding shaped support 103*a-b* are shown extending above the top surface of the body 101.

The guitar stand may also include an amplifier, a vocal amp, a tuner, and Bluetooth™ connection controlling devices such as a smartphone running a mobile application and the internal electronics. The set of controls 203 comprises a E 311, a pair of volume knobs 312*a-b*, four control knobs 313*a-d*, and a pair of speaker control knobs 314*a-b*. In this embodiment, the volume knobs may control the volume of the amplifier and the vocal amp. The four control knobs may adjust treble, middle, bass, and refurb settings to the amplifier. The speaker control knobs may adjust setting including fade, and balance.

FIG. 4 shows the rear view 400 of the guitar stand 100 in which the body 101 has a rear cover 401 to the storage cavity. The front cover 104 and the rear cover 401 may be identical in size and position opposite each other to allow a musician to access items within the storage cavity from either side of the guitar stand 100. No control devices are shown on the rear surface of the body 101 although in other embodiments, controls may be located on both sides of the guitar stand 100. All of the other components of the guitar stand 100 as disclosed regarding FIG. 3 may also be seen in FIG. 4.

Figure 5:
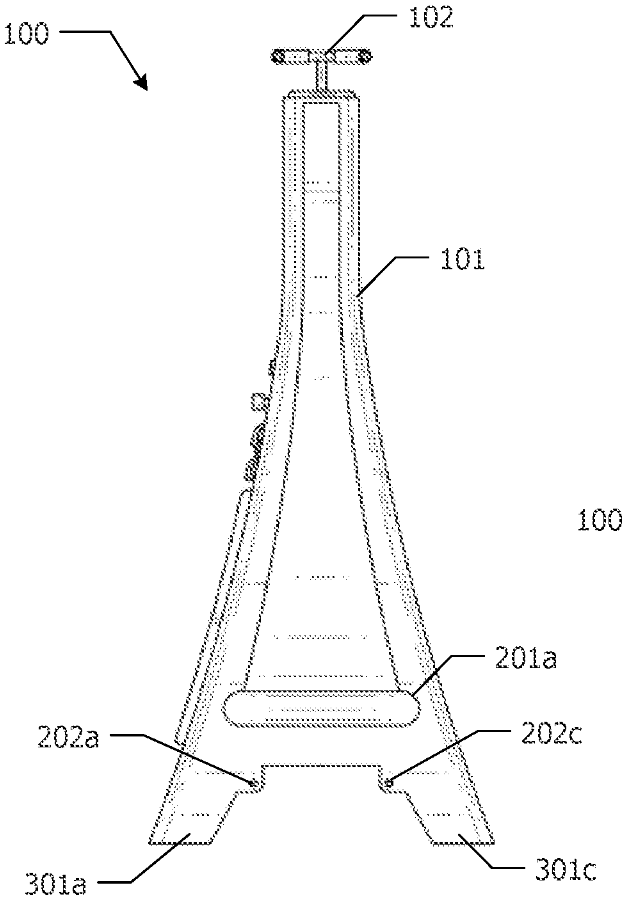
FIG. 5 illustrates a first side view of an example embodiment of an article of manufacture providing an improved multi-guitar stand according to the present invention.
Figure 6:
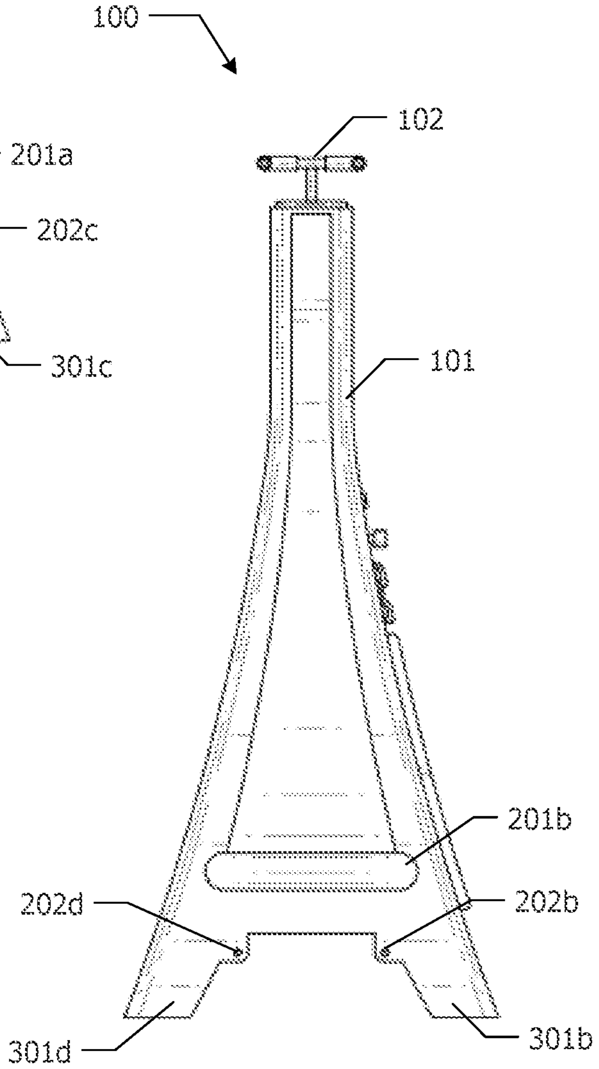
FIG. 6 illustrates a second side view of an example embodiment of an article of manufacture providing an improved multi-guitar stand according to the present invention.

FIG. 5 illustrates a first side view of an example embodiment of an article of manufacture providing an improved multi-guitar stand according to the present invention. Similarly, FIG. 6 illustrates a second side view of an example embodiment of an article of manufacture providing an improved multi-guitar stand according to the present invention. Each of the two side views of the guitar stand 100 shows the set of devices used to support a guitar 110*a-b* when in place on the guitar stand 100.

A guitar 110*a* may be placed with its body on top of a pair of the guitar base supports 202*a-b* with the back of the guitar body resting against the guitar base rests 201*a*. The neck of the guitar 110*a* is inserted within a U-shaped support 103*a* extending outward from the guitar neck support 102. Each of the U-shaped supports 103*a-b* extends outward a distance sufficient to hold the guitar neck within the U-shaped support 103*a-b*.

Figure 7:
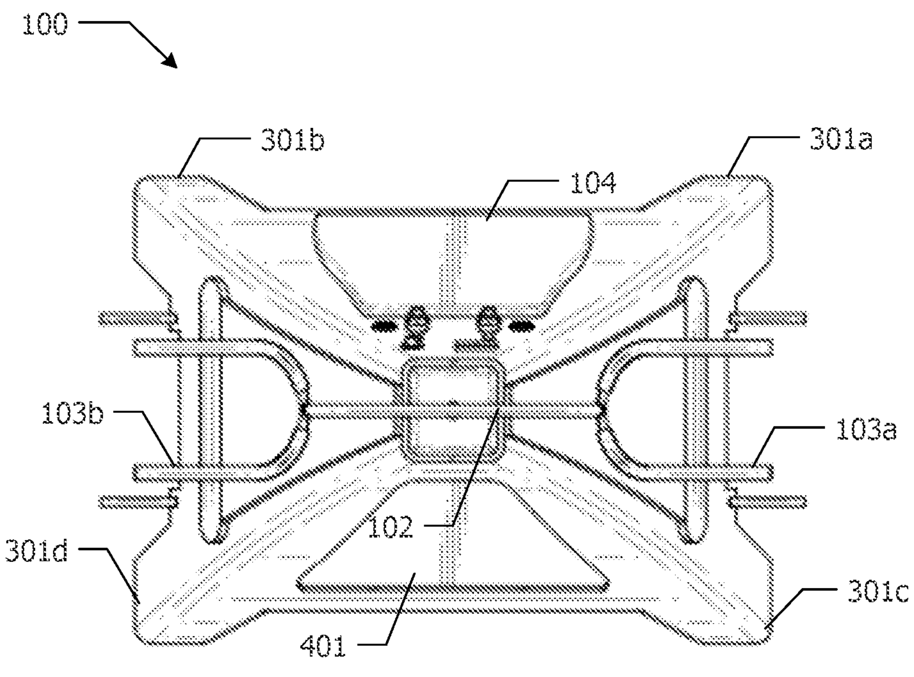
FIG. 7 illustrate a top view of an example embodiment of an article of manufacture providing an improved multi-guitar stand according to the present invention.

FIG. 7 illustrate a top view of an example embodiment of an article of manufacture providing an improved multi-guitar stand according to the present invention. The guitar neck support 102 and the pair of U-shaped guitar neck supports 103*a-b* are shown coupled above a small top surface 701 of the body 101. The U-shaped guitar neck supports 103*a-b* are shown to extend outward placing their outward ends above and between a pair of guitar base supports 202*a-d*. The feet 301*a-d* of the body 101 are shown at each corner of the guitar stand 100. The front cover 104 and the rear cover 401 are shown in place on the front and rear sides of the body 101.

Figure 8:
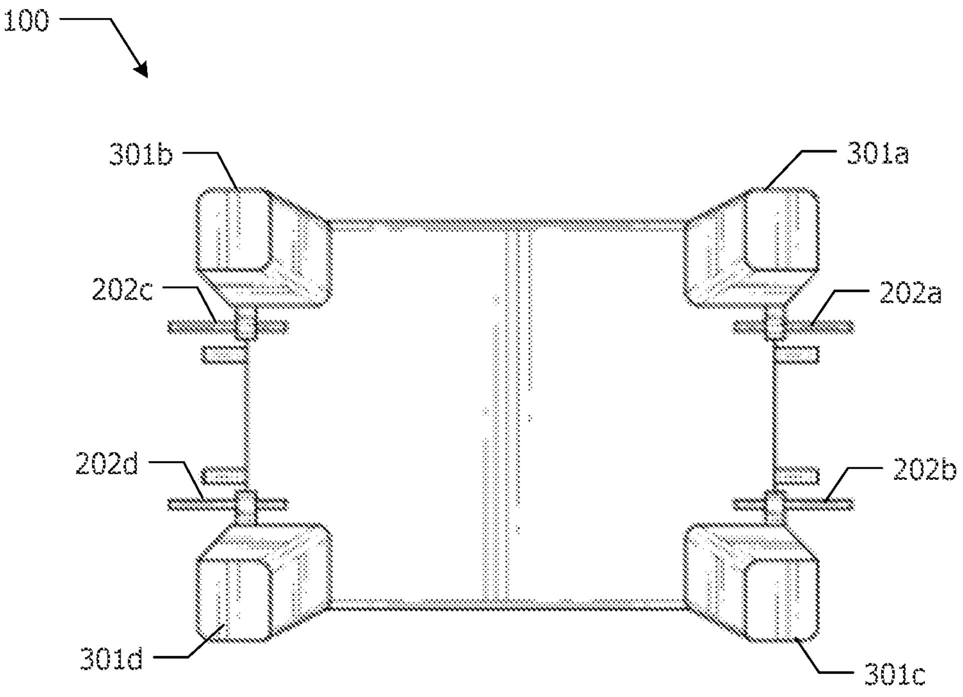
FIG. 8 illustrates a bottom view of an example embodiment of an article of manufacture providing an improved multi-guitar stand according to the present invention.

FIG. 8 illustrates a bottom view of an example embodiment of an article of manufacture providing an improved multi-guitar stand according to the present invention. The bottom surface 801 of the body 101 is shown with each of the feet 301*a-d* positioned extending downward from the corners of the bottom surface 801. The two pairs of guitar base supports 202*a-d* are shown coupled to the guitar stand 100 about the bottom surface 801 of the body 101.

Even though particular combinations of features are recited in the present application, these combinations are not intended to limit the disclosure of the invention. In fact, many of these features may be combined in ways not specifically recited in this application. In other words, any of the features mentioned in this application may be included in this new invention in any combination or combinations to allow the functionality required for the desired operations.

No element, act, or instruction used in the present application should be construed as critical or essential to the invention unless explicitly described as such. Further, the phrase "based on" is intended to mean "based, at least in part, on" unless explicitly stated otherwise.

What is claimed:

1. An article of manufacture providing an improved multi-guitar stand, the multi-guitar stand comprises:

a body having a top surface, a bottom surface, a pair of side surfaces, a front surface and a back surface;

a guitar neck support coupled to the top surface of the body, the guitar neck support comprises a pair of U-shaped supports extending outward from the guitar neck support towards one of the two side surfaces of the body;

a set of feet coupled to the bottom surface of the body to raise the body above a floor;

a first and second guitar base rests coupled to each of the pair of side surface of the body a first and second pair of guitar base supports coupled to each of the pair of side surface of the body about the bottom surface and below the first and second guitar base rests, each of the guitar base supports extend outward;

a storage cavity within the body;

a first opening to the storage cavity within the front surface of the body, the first opening being covered by a smaller detachable cover;

a second opening to the storage cavity within the front surface of the body, the first opening being covered by a larger detachable cover; and a set of electronic controls coupled to the front surface of the body above the smaller detachable cover over the first opening, the set of electronic controls being electrically coupled to electronic circuitry within the storage cavity.

2. The multi-guitar stand according to claim 1, wherein the set of electronic controls comprises a pair of volume knobs, four control knobs, and a pair of speaker control knobs.

3. The multi-guitar stand according to claim 1, wherein the set of electronic controls adjust settings to an internal amplifier and an internal vocal amp.

4. The multi-guitar stand according to claim 3, wherein the volume knobs adjust the volume of the internal amplifier and the internal vocal amp.

5. The multi-guitar stand according to claim 3, wherein the four control knobs adjust the treble, middle, bass, and refurb settings to the amplifier.

6. The multi-guitar stand according to claim 1, wherein the body being wider at a base to create the storage cavity within the body.

7. The multi-guitar stand according to claim 1, wherein the storage cavity comprises Hooks, shelves, and organizing devices.

* * * * *